United States Patent [19]

Kamio et al.

[11] 4,348,498
[45] Sep. 7, 1982

[54] ACCELERATED HARDENING OF UNSATURATED POLYESTER RESINS

[75] Inventors: Hiroyoshi Kamio, Yokohama; Yukio Ogino, Ageo; Kouichi Nakamura, Urawa, all of Japan

[73] Assignee: Nippon Mining Company, Limited, Tokyo, Japan

[21] Appl. No.: 148,355

[22] Filed: May 9, 1980

[30] Foreign Application Priority Data

May 9, 1979 [JP]  Japan ................................ 54-56585

[51] Int. Cl.³ ............................................. C08L 67/06
[52] U.S. Cl. ................................. 525/13; 252/431 R; 252/431 C; 525/17; 525/27
[58] Field of Search ..................... 525/13, 17, 27; 252/431 R, 431 C; 260/33.4 R, 33.6 R

[56] References Cited

U.S. PATENT DOCUMENTS 3,275,710  9/1966  Wooster et al. ..................... 525/13
3,584,076  6/1971  Chetakian ........................... 525/13

Primary Examiner—J. Ziegler
Attorney, Agent, or Firm—Sughrue, Mion, Zinn, Macpeak and Seas

[57] ABSTRACT

Hardening of an unsaturated polyester resin is accelerated by use of (a) a zirconium and/or titanium chelate compound and (b) a cobalt and/or manganese compound as a hardening accelerator.

14 Claims, No Drawings

ACCELERATED HARDENING OF UNSATURATED POLYESTER RESINS

BACKGROUND OF THE INVENTION

1. Field of the Invention

This invention relates to accelerated hardening of an unsaturated polyester resin and, more particularly, to a method of accelerating the hardening of an unsaturated polyester resin by using as a hardening accelerator a combination of (a) a zirconium and/or titanium chelate compound together with (b) a cobalt and/or manganese compound.

2. Description of the Prior Art

For cold- or warm-setting molding of unsaturated polyester resins, there have hitherto been proposed methods in which organic peroxides such as t-butyl peroxide, methyl ethyl ketone peroxide, cyclohexanone peroxide and lauroyl peroxide are used as hardeners and as hardening accelerators are used cobalt compounds such as cobalt naphthenate and cobalt octoate, manganese compounds such as manganese naphthenate and manganese stearate, vanadium compounds and compounds such as dimethylaniline and dimethyl-p-toluidine.

Of these hardening accelerators, the cobalt compounds such as cobalt naphthenate and cobalt octoate have been placed in practical use since they have high hardening acceleration capability and provide high quality cured products. These cobalt compounds, however, have disadvantages in that they cause coloring of the cured products. Further, they are limited in supply, thus increasing production costs. While manganese compounds and vanadium compounds are more easily available and cause no coloring, their hardening acceleration capability is low and it is therefore necessary to effect the hardening at high temperatures. This makes manganese and vanadium compounds unsuitable for use in many applications.

SUMMARY OF THE INVENTION

The objective of this invention is to provide improved hardening accelerators for unsaturated polyester resins.

As a result of investigations to provide more improved hardening accelerators, the present inventors have found that certain zirconium and/or titanium chelate compounds, which themselves are low in hardening acceleration capability, when used in combination with cobalt and/or manganese compounds, exhibit markedly high hardening acceleration capability without disadvantages such as coloring.

This invention, therefore, provides an improved method of hardening unsaturated polyester resins in which method (a) zirconium and/or titanium chelate compounds containing hydroxycarboxylic acid, $\beta$-diketone or $\beta$-ketoester as ligands and (b) cobalt and/or manganese compounds are combined and used as hardening accelerators.

DETAILED DESCRIPTION OF THE INVENTION

The metals of zirconium and titanium used in this invention are found in the form of oxides over a wide area; Clarke numbers of titanium and zirconium are respectively 10 and 20. Industrially the metals are produced in forms of compounds, that is, as zirconium oxychloride and zirconium carbonate, and titanium tetrachloride, and they are available relatively cheaply. Therefore, the chelate compounds of zirconium or titanium used in this invention can be obtained at low cost.

The zirconium chelate compounds used in the invention can easily be obtained as O-coordinated chelate compounds by reacting compounds such as zirconium oxychloride, zirconium ammonium carbonate and a zirconium tetraalkoxide (e.g., zirconium tetraisopropoxide and zirconium tetrabutoxide) with $\beta$-diketones such as acetylacetone, $\beta$-ketoesters such as acetoethyl acetate, or hydroxycarboxylic acids such as mandelic acid and salicylic acid.

The titanium chelate compounds used in the invention can also easily be obtained by reacting a titanium tetraalkoxide derived from titanium tetrachloride (such as titanium tetraethoxide and titanium tetraisopropoxide) with a $\beta$-diketone, $\beta$-ketoester or hydroxycarboxylic acid as described above.

The zirconium and titanium chelate compounds can be used alone or in combination as component (a) in this invention.

Generally, these chelate compounds are dissolved in hydrocarbon solvents such as styrene, toluene and xylene or in mixed solvents of such hydrocarbons and alcohols such as ethanol and isopropyl alcohol for use.

These chelate compounds as component (a) are used as hardening accelerators in combination with cobalt and/or manganese compounds as component (b) in accordance with the invention. The two components of the combination may be added to resins separately or together in given proportions.

The hardening acceleration rate depends upon the amount of metals present in the hardening accelerator.

The amount of hardening accelerator used in this invention varies depending upon the temperature at which the resin is cure-molded, the molding method and the molding conditions. The hardening accelerator of this invention can be used in an amount as a metal approximately equal to that of cobalt compound (e.g., cobalt naphthenate) which has hitherto been used as a hardening accelerator. In general, this is about 0.01 to 0.1% by weight as a metal based on the amount of the resin. An amount of component (a) which can be present in the hardening accelerator of this invention is about 10% to 90%, preferably 50% to 90% as the metal weight.

The cobalt and manganese compounds can be used alone or in combination as component (b) in this invention.

Thus, in accordance with the hardening acceleration combination of this invention, the amount of cobalt in the cobalt compound used can be reduced while retaining the same acceleration of hardening. Further, use of reduced amount of cobalt compound can result in substantial freedom from coloring due to necessity of a significant amount of cobalt in the cobalt compound as used alone in the conventional method. If component (a) is added within the above range to the cobalt compound which is used in conventional amount, the hardening rate is even more accelerated.

The unsaturated polyester resins which can be accelerated in hardening according to this invention are generally those of dehydration polycondensates of maleic anhydride as an unsaturated dibasic acid, phthalic anhydride as a saturated dibasic acid, and a dihydric alcohol dissolved in styrene as a vinyl monomer. In addition, they include unsaturated polyester resins comprising dehydration polycondensates of unsaturated dibasic acid or anhydride such as fumaric acid, itaconic acid and tetrahydrophthalic anhydride; a saturated dibasic acid or anhydride such as isophthalic acid, terephthalic acid, adipic acid, sebacic acid and tetrachlorophthalic anhydride; and a dihydric alcohol such as ethylene glycol, diethylene glycol, hydrated bisphenol A and 2,2-bis(4-oxyethoxyphenyl)propane dissolved in a vinyl monomer such as vinyltoluenediallyl phthalate and triallyl cyanuric acid.

When the hardening accelerators of this invention are added to the unsaturated polyester resins as described above in combination with hardeners consisting of organic peroxides, the resultant resin mixtures gradually increase in viscosity after an induction period, are converted to a jelly form with evolution of heat and finally become insoluble and unmeltable cured products.

As illustrated in the following examples which are illustrative but not limiting, the method of this invention permits the formation of hardened resins having properties superior to those of hardened resins wherein cobalt or manganese compounds alone are used as hardening accelerators; furthermore, the invention permits the reduction of the amount of cobalt in the cobalt compound to be used, which is advantageous from an economic standpoint.

The following examples are given to illustrate this invention in greater detail.

EXAMPLE 1

Preparation of Unsaturated Polyester Resin

Phthalic anhydride, maleic anhydride and propylene glycol in a molar ratio of 1.0:1.0:2.2 were mixed at a temperature of 80° C. to 100° C.; the mixture was gradually raised in temperature, and permitted to react for about 4 hours at 100° C. and for about 4 hours at 200° C. When the acid value of the reaction product reached about 40, the reaction was stopped. To 60 parts of the reaction product were added 40 parts of styrene and 100 ppm of hydroquinone at a temperature of 60° C. to 70° C. to obtain a liquid unsaturated polyester resin.

According to JIS (Japanese Industrial Standard) K6901, 50 g of the above prepared unsaturated polyester resin was placed in an isothermic chamber kept at 25°±0.5° C., and to this unsaturated polyester resin were added as a hardening accelerator cobalt naphthenate and zirconium acetylacetonate in varying amounts as illustrated in Table 1 and also as a hardener 0.5% by weight of methyl ethyl ketone peroxide. The hardening accelerator was dissolved in xylene for use. The resultant mixture was reacted while stirring according to JIS K6901. The results of test items according to JIS K6901 are shown in Table 1.

TABLE 1

| Run No. | 1 | 2 | 3 | 4 | 5 | 6 | 7 |
|---|---|---|---|---|---|---|---|
| Cobalt Naphthenate | 0.03 | 0.024 | 0.015 | 0.009 | 0.003 | 0.006 | — |
| Zirconium Acetylacetonate | — | 0.006 | 0.015 | 0.021 | 0.027 | 0.024 | 0.03 |
| (GT)min | 15.3 | 14.0 | 12.5 | 7.0 | 14.5 | 7.6 | >60 |
| (CT)min | 33.8 | 30.5 | 28.0 | 18.0 | 32.0 | 19.5 | — |
| Max °C. | 145 | 145 | 145 | 146 | 145 | 144 | — |
| Reaction Rate (°C./min) | 7.9 | 8.8 | 9.4 | 13.3 | 8.2 | 11.5 | — |
| Color | Pink | Slightly Pink | Very Slightly Pink | Slightly Yellow | Slightly Yellow | Slightly Yellow | — |

Note:
(1) The amounts of the hardening accelerators indicate the weight percents of Co or Zr, calculated as the metal, based upon the amount of resin.
(2) (CT)min: the time in minutes required for the solution to reach the maximum temperature after adding the hardener and hardening accelerator
(GT)min: the time in minutes required for the solution to reach 30° C. after the test sample is mixed with the hardener and hardening accelerator
Max °C.: temperature at which the solution reaches the maximum temperature
(3) The reaction rate was calculated from the following equation:

$$\text{Reaction Rate} = \frac{\text{Max °C.}}{(\text{CT})\text{min} - (\text{GT})\text{min}}$$

(4) The color "slightly yellow" is identical to the color of the resin per se.

It is clear from Table 1 that the hardening accelerators of this invention containing the zirconium compound and cobalt compound are superior in reaction rate and improved in coloring as compared to the hardening accelerator containing the cobalt compound alone. Further, when used the hardening accelerator containing the zirconium compound alone, the resin was not cured.

20 cm×20 cm Glass fiber mats were impregnated with 108 g of each of unhardened resins having the same composition as in Run Nos. 1 and 4, which were hardened at room temperature for 12 hours and then postcured at 100° C. for 2 hours to produce Samples A and B, respectively. For the thus obtained cured products, the physical properties were measured in accordance with JIS K6919. Bending strength, modulus and water absorption are standards for evaluation of cured products; the results are shown below:

| Sample | Bending Strength (kg/mm$^2$) | Bending Modulus (kg/mm$^2$) | Boiling Water Absorption (increase of weight after 2 hours (%) |
|---|---|---|---|
| A | 20.6 | 905 | 0.76 |
| B | 28.9 | 1,110 | 0.62 |

From the results set forth above, it can be seen that the physical properties of the hardened resin of Run No. 4 wherein cobalt naphthenate and zirconium acetylacetonate are simultaneously used are superior to those of the resin of Run No. 1.

EXAMPLE 2

Using the same resin as in Example 1, the procedure of Example 1 was used except that cumyl peroxide was used as a hardener and those compounds as indicated in Table 2 were used as hardening accelerators. The results are shown in Table 2.

TABLE 2

| Run No. | 1 | 2 | 3 | 4 | 5 |
|---|---|---|---|---|---|
| Cobalt Naphthenate | 0.03 | 0.012 | 0.012 | 0.012 | — |
| Zirconium Ethyl Acetoacetate | — | 0.018 | — | — | — |
| Zirconium Acetylacetonate | — | — | 0.018 | — | — |
| Titanium Acetylacetonate | — | — | — | 0.018 | 0.03 |
| (GT)min | 34.6 | 40.7 | 31.4 | 41.9 | >60 |
| (CT)min | 58.5 | 63.4 | 52.3 | 65.7 | — |
| Max °C. | 126 | 127 | 132 | 128 | — |
| Reaction Rate (°C./min) | 5.3 | 5.6 | 6.3 | 5.4 | — |
| Color | Pink | Very Slightly Pink | Very Slightly Pink | Very Slightly Pink | — |

Note:
The amounts of the hardener and hardening accelerators indicated in Table 2 represent the weight percents of Co or Zr as a metal component based upon the amount of resin.

It is clear from Table 2 that the same excellent hardening acceleration property as well as improved coloring property can be seen in the hardening accelerators of this invention even though the kind of zirconium compound was changed or the zirconium compound was replaced by the titanium compound. Further, when used the hardening accelerator containing the titanium compound alone, the resin was not cured.

EXAMPLE 3

Using the same resin as in Example 1, the procedure of Example 1 was followed except that cyclohexanone peroxide was used as a hardener, those compounds indicated in Table 3 were used as hardening accelerators, and the reaction was conducted in an isothermic chamber at 50° C. The results are shown in Table 3.

TABLE 3

| Run No. | 1 | 2 | 3 | 4 |
|---|---|---|---|---|
| Manganese Naphthenate | 0.05 | 0.02 | 0.02 | 0.02 |
| Zirconium Acetylacetonate | — | 0.03 | — | — |
| Zirconium Salicylate | — | — | 0.03 | — |
| Titanium Acetylacetonate | — | — | — | 0.03 |
| (CT)min | 77.5 | 33.8 | 56.5 | 39.5 |
| Max °C. | 149 | 173 | 160 | 175 |

Note:
The amounts of the hardener and hardening accelerators in Table 3 indicate the weight percents of Mn and Zr as the metal based on the amount of the resin. The color of the hardened resin in each run was slightly yellow which color is identical to the color of the resin per se.

It is clear from Table 3 that the hardening accelerators of this invention give rise to reduction of hardening time without coloring problem as compared to the hardening accelerator containing the manganese compound alone.

EXAMPLE 4

Maleic anhydride, itaconic acid, isophthalic acid, adipic acid, propylene glycol and dipropylene glycol were reacted in a molar ratio of 0.5:0.5:0.5:0.5:1.2:1.0 to obtain a polycondensate with an acid value of about 40, and 60 parts of the polycondensate was dissolved in 40 parts of styrene to provide an unsaturated polyester resin.

To the unsaturated polyester resin were added 1.0% by weight of, as a hardener, methyl ethyl ketone peroxide and the hardening accelerators as indicated in Table 4. The hardening accelerators were all dissolved in xylene for use. The resultant mixtures were hardened in an isothermic chamber at 25° C. in the same manner as in Example 1. The results are shown in Table 4.

TABLE 4

| Run No. | 1 | 2 | 3 |
|---|---|---|---|
| Cobalt Naphthenate | 0.03 | 0.01 | 0.01 |
| Zirconium Acetylacetonate | — | 0.02 | — |
| Zirconium Octoate | — | — | 0.02 |
| (GT)min | 21.3 | 24.0 | 32.5 |
| (CT)min | 39.8 | 39.5 | 60.5 |
| Max °C. | 146 | 147 | 124 |

Note:
The amounts of the hardening accelerators in Table 4 indicate the weight percents of Co and Zr as metal based upon the amount of resin.

It is clear from Table 4 that even though a compound which is not a chelate compound is used as the zirconium compound, the hardening time cannot be shortened.

While the invention has been described in detail and with reference to specific embodiments thereof, it will be apparent to one skilled in the art that various changes and modifications can be made therein without departing from the spirit and scope thereof.

What is claimed is:

1. In a process for hardening an unsaturated polyester resin using an organic peroxide as a hardener, a method for accelerating the hardening comprising adding to said resin and hardener, (a) a member selected from the group consisting of a zirconium chelate compound, a titanium chelate compound and a mixture thereof and (b) a member selected from the group consisting of a cobalt compound, a manganese compound and a mixture thereof, as a hardening accelerator.

2. The process of claim 1, wherein component (a) has as a ligand a β-diketone, β-ketoester or hydroxycarboxylic acid.

3. The process of claim 1, wherein components (a) and (b) are present in such amount that the ratio of a member selected from the group consisting of titanium, zirconium and a mixture thereof in component (a) to a member selected from the group consisting of cobalt, manganese and a mixture thereof in component (b) is in the range of about 10:90 to 90:10.

4. The process of claim 1 or 3, wherein the combined amount of the metals in components (a) and (b) is from about 0.01 to 0.1% by weight of the amount of the resin.

5. The process of claim 2, wherein said β-diketone is acetylacetone.

6. The process of claim 2, wherein said β-ketoester is acetoethyl acetate.

7. The process of claim 2, wherein said hydroxycarboxylic acid is mandelic acid or salicylic acid.

8. The process of claim 2, wherein components (a) and (b) are added separately.

9. The process of claim 2, wherein components (a) and (b) are added together.

10. The process of claim 9, wherein components (a) and (b) are dissolved in a hydrocarbon solvent or a mixed solvent of a hydrocarbon solvent and an alcohol for use.

11. The process of claim 2, wherein said ligand is a β-diketone.

12. The process of claim 2, wherein said ligand is a β-diketoester.

13. The process of claim 2, wherein said ligand is a hydroxycarboxylic acid.

14. The process of claim 3, wherein the amount of the hardening accelerator is about 0.01 to 0.1% by weight as metal based on the amount of the unsaturated polyester resin.

* * * * *